United States Patent Office

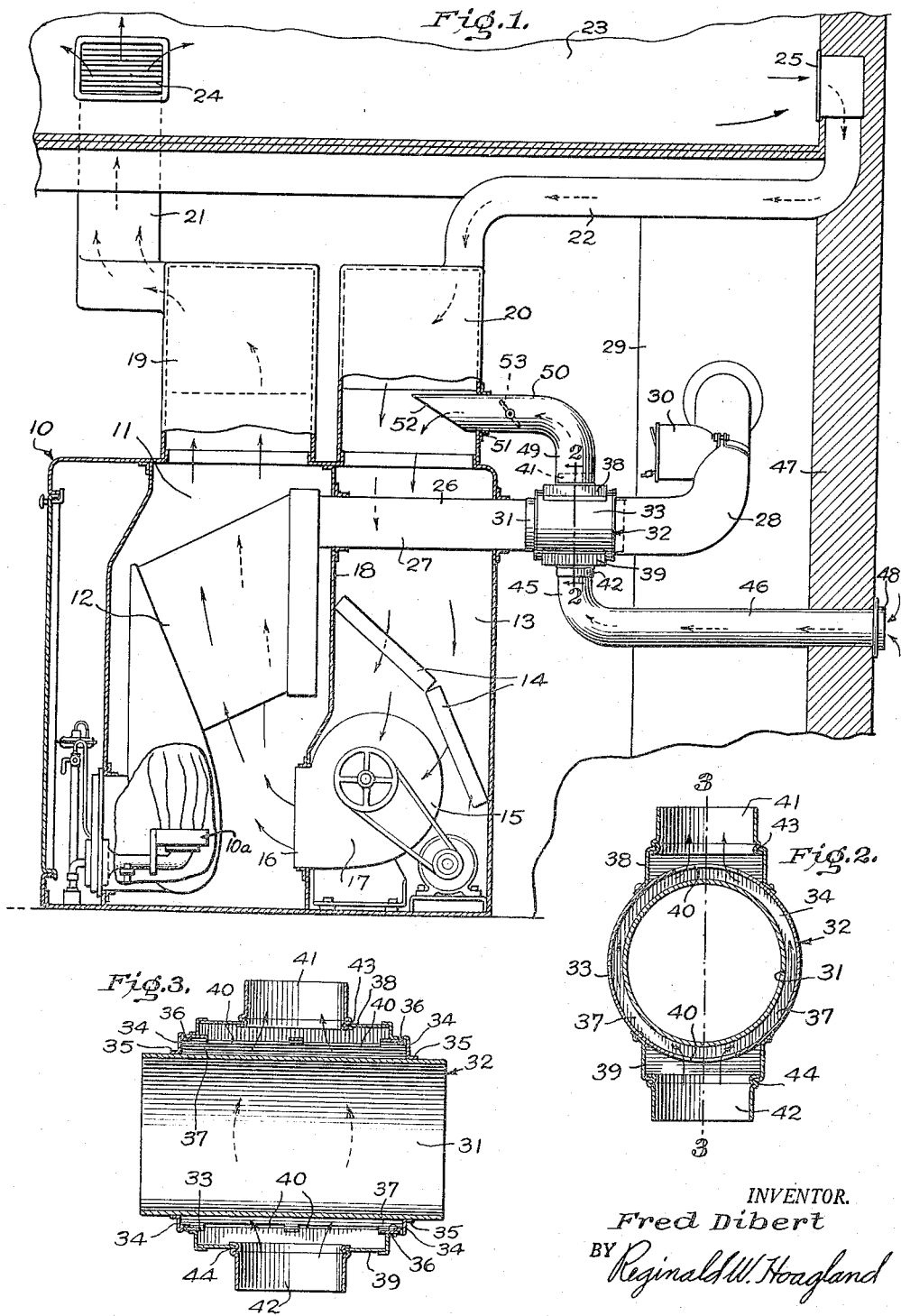

2,962,218
Patented Nov. 29, 1960

2,962,218

HOT AIR HEATING SYSTEM

Fred Dibert, 2617 Prospect St., Flint, Mich.

Filed July 15, 1957, Ser. No. 671,888

1 Claim. (Cl. 237—55)

The present invention relates to hot air heating systems for buildings and like enclosures, and it consists in the combinations, constructions, and arrangements of parts herein described and claimed.

To economize on fuel consumption and to eliminate drafts, modern buildings, such as single-family dwellings, are generally sealed and insulated with weatherstripping, storm windows, and storm doors to such a degree that air consumed by combustion at the burners of the heating furnaces and air exhausted through draft diverters in stacks, clothes driers, kitchen ventilator fans, etc., reduce the air pressures inside the dwellings below that of outside atmospherical pressure. This sub-normal pressure within the dwelling naturally causes cold air to rush into the dwelling every time a door is opened and also produces cold drafts due to seepage of cold air around windows and other outlets no matter how well they are sealed, thus partially defeating the purpose of sealing and insulating the dwelling. It therefore can be seen that by equalizing the air pressure inside such tightly sealed dwelling with that of outside atmospherical pressure, there would not be such an exchange of air at the outlets of the enclosure and that greater economy can be had in the consumption of fuel and especially when maintaining a selected temperature in the dwelling with the use of a thermostat furnace control.

The present invention is applied to a forced air heating system, and it consists of a pipe for supplying fresh air from outside of the building or like enclosure to the cool air return passageway of the air circulating system prior to it being forced into the heating chamber of the furnace by the blower. The outside fresh air is preheated before entering the cool air return passageway by the hot combustion gases passing through the smoke flue of the furnace. This is accomplished by interposing in the fresh air pipe a cylindrical jacket that surrounds and is spaced from a wall portion of the smoke flue in a manner to induce maximum impingement of air passing through the fresh air supply pipe with the hot wall of the smoke flue. A damper is located in the fresh air supply pipe between the preheater and cool air return passageway of the furnace for controlling the amount of fresh air permitted to enter so as to equalize the air pressure within the enclosure with outside atmospherical pressure.

It is accordingly an object of the invention to provide a novel fresh air supply to a hot air heating system for equalizing air pressure within an enclosure with that of outside atmospherical pressure.

Another object of the invention is to provide, in a heating system of the character set forth, a preheating means for the fresh air being supplied to the heating system, the preheater construction also forming a part of the invention.

A further object of the invention is to provide, in a heating system as above set forth, a damper in the fresh air supply pipe for regulating the quantity of fresh air permitted to enter the heating system, so as to equalize air pressures within the enclosure with that outside the enclosure.

It is also an object of the invention to provide an improvement to a heating system of the above-indicated character which is simple and substantial in construction, economical to manufacture, and thoroughly efficient and practical in use.

These, together with various auxiliary features and objects of the invention which will later become apparent as the following description proceeds, are attained by the present invention, a preferred embodiment of which has been illustrated by way of example only in the accompanying drawings, wherein:

Figure 1 is a side elevation and sectional view through a forced air furnace and duct system therefor, showing the improved air pressure equalizing improvement installed thereon;

Figure 2 is a vertical cross section taken on line 2—2 of Figure 1; and

Figure 3 is also a vertical section taken on line 3—3 of Figure 2.

Referring more particularly to the accompanying drawings wherein like numerals designate similar parts throughout the different views, there is indicated generally by the numeral 10, a forced air heating furnace which, for the purpose of illustration, is shown as being of gas-fired type having a burner 10ª, and as having a hot air compartment 11 with a heat exchanger 12 therein and a return air compartment 13 enclosing filters 14 and a blower 15. The blower 15, while being located in the lower portion of the return air compartment 13 and receiving its intake of air from said compartment, discharges its air into the hot air compartment 11 through an open end of a tangentially projecting portion 16 of the blower housing 17. A partition wall 18 that divides the return air compartment 13 from the hot air compartment 11 has an opening therein through which the tangentially projecting portion 16 extends. A main hot air flow duct 19 and a main cool air return duct 20 are shown as connected to the upper portions of the hot air compartment 11 and return air compartment 13, respectively, and it is through these ducts and branch ducts 21 and 22 leading to and from different rooms of the dwelling that air is circulated by the blower 15. To simplify illustration, only a single room 23 is shown as being in communication through registers 24 and 25 with a branch hot air flow duct 21 and a branch cool air return duct 22, respectively.

A smoke flue 26 composed of a pair of flue sections 27 and 28 is shown as having one end connected to the heat exchanger 12 of the furnace, extending through the cool air return compartment 13, and having its opposite end connected to a chimney 29 for carrying away combustion fumes generated by the burning of fuel in the furnace, there being a draft diverter 30 in the flue section 28.

The preceding detailed description, for all practical purposes, defines the same general construction as that now commonly employed in forced hot air heating systems, and it is to a construction and arrangement of elements of this character that slight modifications have been made and parts added which produce a different result and which constitute the subject matter of the present invention.

Interposed between and telescopically connected at its opposite ends to the flue sections 27 and 28 is an inner cylindrical tube 31 of a heat exchanger generally designated by the numeral 32. The tube 31 bridges a space provided between the flue sections 27 and 28 and has its forward end portion tightly encircling an end portion of the section 27 and its rear end portion tightly within an end portion of the section 28, so as to preclude the escape of combustion fumes at opposite ends of the heater. Encircling the tube 31 and spaced therefrom is an outer cylinder-like tube 33 of slightly shorter length than the inner tube and concentric therewith. Ringlike end walls 34 with oppositely directed annular flanges 35 and 36 at their inner and outer diameters that engage and are secured to the inner and outer tubes 31 and 33, respectively, close off the ends of the annular space or chamber 37 between said tubes. On the upper and lower sides of the outer tube 33 are secured shallow boxlike casings 38 and 39 that communicate their rectangular interiors with the annular chamber 37 through openings 40 cut in the wall of the outer tube 33 and within the confines of said casings. Pipe nipples 41 and 42 are fixed in holes 43 and 44, respectively, in the upper wall of the casing 38 and lower wall of the casing 39 and communicate with the interiors of said casings.

The pipe nipple 42 is of slightly larger diameter than the pipe nipple 41 and encircles and is telescopically connected to an upturned end 45 of a horizontal pipe 46 that extends through an outside wall 47 of the building, as at 48, for supplying fresh air to the heat exchanger 32. The pipe nipple 41 of slightly smaller size is received in and is telescopically connected to a downturned end 49 of a horizontal pipe 50 that has its other end extended through an opening 51 and into the main cool air return duct 20. The end of the pipe 50 within the duct 20 is beveled at an angle, as at 52, and in a direction so that the down draft of air being circulated in the cool air return passageway will not enter the pipe 50, but instead will create a suction in the pipe 50 for drawing fresh air through said pipe, heat exchanger 32, and pipe 46. There is a damper 53 in the pipe 50 for controlling the flow of fresh air into the cool air return duct 20. It will be apparent that the position of the damper 53 controls the quantity and temperature of outside air entering the heating system and also determines the pressure of said outside air in the chamber 37 around the smoke flue portion 31. By maintaining a pressure in said chamber greater than the smoke pressure within the flue, any leakage communicating said chamber with said smoke flue would result in the entrance of fresh outside air into the smoke flue, and not smoke with its gaseous products entering the fresh air supply line. This damper while being shown as manually operated could be connected to and automatically controlled either electrically or mechanically by a pressure actuated device located anywhere within the enclosure.

The cross sectional area of each of the fresh air supply pipes 46 and 50 is approximately equal to the area of the two diverted passageways of air in the chamber 37 at opposite sides of the inner tube 31, thus the fresh air is not retarded in its flow through the heat exchanger 32 while obtaining maximum impingement of said air against the hot cylindrical wall of the tube 31 that forms a part of the smoke flue.

While the fresh air heat exchanger 32 is shown as being constructed of a number of different parts, welded or otherwise secured together, it is to be understood that said heat exchanger can just as well be constructed of a single inner tube and a pair of longitudinally split half sections stamped or otherwise formed and secured to one another and about said single tube.

Also, it should be understood that the heat exchanger 32 need not be restricted to the location shown and described, but can just as well be placed anywhere along the smoke flue 26, and if installed at the time of manufacture of the furnace, could for all practical purposes be positioned within the cool air return compartment 13 of the furnace.

In view of the foregoing description taken in conjunction with the accompanying drawings, it is believed that a clear understanding of the construction, operation, and advantages of the invention will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

In combination with a forced air heating system confined within an enclosure for heating the interior of said enclosure, said heating system including a furnace having a combustion chamber with a burner therein which consumes oxygen within said enclosure and having an air compartment heated by said combustion chamber, at least one hot air flow passageway leading from the air compartment of said furnace and open to the interior of said enclosure, at least one cool air return passageway also open to the interior of said enclosure and leading back to and in communication with said air compartment of said furnace, a power driven blower in said compartment for forcing heated air from said compartment to the interior of said enclosure and for drawing cooled air from the interior of said enclosure back to said compartment, and a smoke flue in communication with said combustion chamber and extended outside of said enclosure; an air supply pipe communicating air outside of said enclosure with said cool air return passageway so as to replenish air to said enclosure for air consumed by the burner, a heat exchanger in said air supply pipe and around a portion of said smoke flue so as to preheat air passing through said air supply pipe prior to its entry into said cool air return passageway, the portion of said air supply pipe extending from said heat exchanger to said cool air return passageway being in a general upward direction so as to position the end of said air supply pipe that opens into said cool air return passageway at a higher elevation than the connection of said pipe to said heat exchanger, and a damper in said air supply pipe between the heat exchanger and the cool air return passageway for controlling the quantity and temperature of outside air entering the heating system and for creating a pressure of outside air in the heat exchanger that is greater than the smoke pressure in the smoke flue.

References Cited in the file of this patent
UNITED STATES PATENTS

| | | |
|---|---|---|
| 1,675,384 | Schau | July 3, 1928 |
| 1,733,759 | Snell | Oct. 29, 1929 |
| 2,198,136 | Stuart | Apr. 23, 1940 |
| 2,243,503 | Frenette | May 27, 1941 |
| 2,560,246 | Ream | July 10, 1951 |
| 2,658,504 | Jaye et al. | Nov. 10, 1953 |